Aug. 15, 1972 F. C. SITZLER ETAL Re. 27,463

CONNECTOR BLOCK

Original Filed Oct. 11, 1967

INVENTORS

FRED C. SITZLER
JERRY A. KENDALL
QUENTIN BERG

BY Whittemore, Hulbert + Belknap

ATTORNEYS

United States Patent Office

Re. 27,463
Reissued Aug. 15, 1972

27,463
CONNECTOR BLOCK

Fred C. Sitzler, Mechanicsburg, Pa., Jerry A. Kendall, Garland, Tex., and Quentin Berg, New Cumberland, Pa.; said Sitzler and said Kendall assignors to Berg Electronics, Inc.

Original No. 3,430,185, dated Feb. 25, 1969, Ser. No. 674,464, Oct. 11, 1967. Application for reissue Feb. 23, 1971, Ser. No. 118,149
Int. Cl. H01r *13/48*
U.S. Cl. 339—59 R 26 Claims

Matter enclosed in heavy brackets [ ] appears in the original patent but forms no part of this reissue specification; matter printed in italics indicates the additions made by reissue.

ABSTRACT OF THE DISCLOSURE

A connector block for receiving and removably holding an electrical terminal in a cavity is provided with a cam and a latch longitudinally spaced along one side of the cavity so that during insertion of the terminal into the cavity the cam engages the terminal and holds the latch away from the terminal to prevent wearing away of the latch by repeated insertion of the terminal into the cavity. When the terminal is fully inserted, the latch falls in place to secure the terminal in the cavity. The cam and latch are located on a flexible strip formed in the side of the cavity with both ends of the strip secured to the block to facilitate movement of the cam and latch away from the terminal by flexing of the strip.

Background of the invention

The invention relates to insulating connector blocks for removably holding circuit elements, particularly electric terminals.

In conventional connector blocks terminals are inserted into the terminal cavities so that portions of the terminal engage latch portions of the connector block and prevent withdrawal of the terminal from the cavity. If it is desired to remove the terminal from the cavity, a tool may be inserted into the cavity to bias the portion of the terminal engaging the latch away from the latch, following which the terminal may be removed from the cavity. This type of conventional latching mechanism has the disadvantage that with repeated insertion and withdrawal of the terminal the connector block latch is worn down by the terminal and is no longer capable of properly securing the terminal in the terminal cavity. The failure of a single terminal latch in a multi-terminal connector block necessitates the replacement of the entire block to remedy the condition.

Summary of the invention

In a connector block according to the invention insertion of a terminal into the terminal cavity automatically moves the terminal latch away from the cavity until the terminal has been seated in the cavity. At this time the lach drops back into engagement with the terminal to secure the same against movement in the cavity. Movement of the terminal latch is achieved by providing a cam in the cavity side wall carrying the latch so that during insertion the terminal will engage the cam and move it and the associated latch away from the terminal, thus eliminating insertion wear on the latch. The flexing of the cam and latch away from the terminal during insertion is improved by positioning them on a strip portion of the connector block. While the latch secures and accurately locates the terminal in position within the terminal cavity, the cam provides a fail-safe lock for preventing removal of the terminal from the cavity in case of latch failure.

When it is desired to remove the terminal from the cavity the strip portion of the connector block on which the cam and latch are mounted may be flexed away from the cavity by a suitable tool, thus bringing the cam and latch out of engagement with the terminal and permitting free removal from the connector block.

Description of the preferred embodiment

Figure 1:
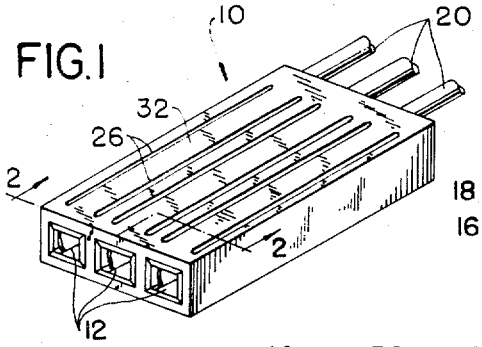
FIG. 1 is a perspective view of a connector block according to the invention.
Figure 2:
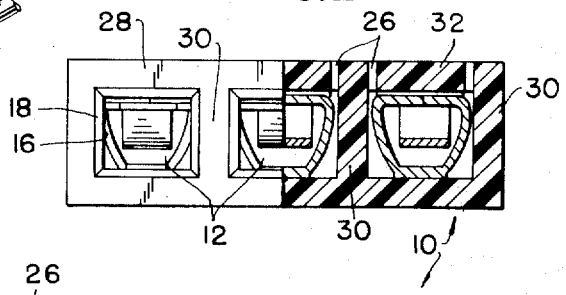
FIG. 2 is an enlarged partial sectional view taken along line 2—2 of FIG. 1.
Figure 3:
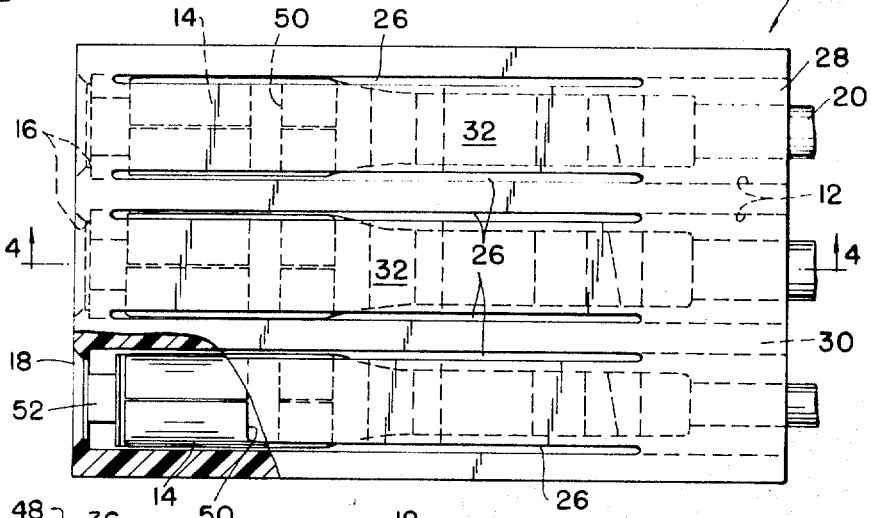
FIG. 3 is a partially broken away top view of FIG. 1.
Figure 4:
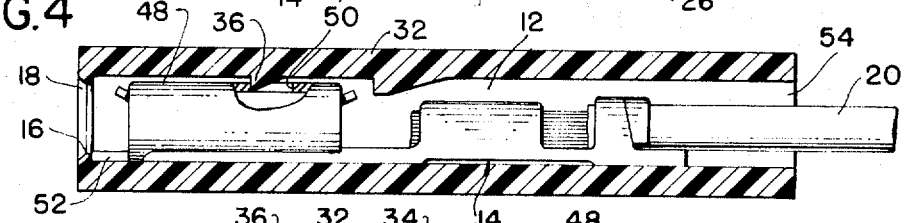
FIG. 4 is a sectional view taken along line 4—4 of FIG. 3.

FIG. 1 shows a one-piece connector block 10 which is preferably formed from insulating material having a degree of resiliency, such as a plastic. The block 10 is provided with a number of double ended terminal cavities 12 which extend throughout the breadth of the block. Female contact terminals 14 are held in cavities 12, as shown in FIGS. 3 and 4, in position to receive male contact elements (not shown) which are inserted into the cavities through openings 16 located on one side face of the block. These openings are provided with bevels 18 to facilitate insertion of the male contacts into the cavities 12 and into electrical connection with terminals 14. Each of the terminals 14 is secured to an insulated wire 20 by means of a wire crimp ferrule 22 and insulation crimp ferrule 24.

Figure 5:
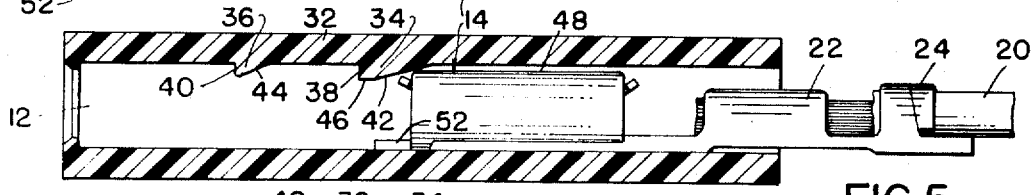
FIGS. 5 and 6 are similar to FIG. 4 and illustrate insertion of a terminal into a terminal cavity in the connector block.

Slits 26 extend through the top wall 28 of the connector block adjacent the cavity side walls 30 and run along nearly the entire length of the cavities. As best illustrated in FIG. 3, the slits 26 have approximately the same longitudinal extent along cavities 12 as terminals 14 when fully inserted into block 10. The slits in top wall 28 define a longitudinally extending strip 32 at the top of each cavity. Because of the resiliency of the material used to form block 10, the strips 32 are slightly flexible Each strip 32 carries an inwardly projecting cam member 34 and an inwardly projecting latch member 36. Both cam and latch members 34 and 36 extend laterally across the width of the strips 32. As illustrated in FIG. 5, cam member 34 projects into the terminal cavity 12 slightly further than latch member 36. Flat locking faces 38 and 40 are provided on the side of cam member 34 and latch member 36 respectively facing cavity opening 16. The other side faces 42 and 44 of cam and latch members 34 and 36 respectively slope toward strip 32. A flat contact surface 46 is provided on cam member 34.

The top 48 of contact terminal 14 is provided with a lateral slot 50 so that when the terminal is fully inserted into the cavity 12, latch member 36 extends into the slot and side face *or latch* 40 of latch member engages the lead edge of the slot to prevent withdrawal of the terminal from the cavity. The cam member 34 projects away from strip 32 and past the top 48 of the terminal to provide a fail-safe stop in the unlikely event that latch member 36 fails. The terminal 14 is prevented from movement toward opening 16 by lead end 52 which abuts bevel 18.

Terminals 14 are inserted into the terminal cavities 12 of the connector block through openings 54 of the cavities located on the opposite side of the connector block from openings 16. As shown in FIGURE 5, the terminal 14 is freely pushed into the cavity 12 until the lead end of the top 48 of the terminal engages beveled or tapered surface 42 of cam member 34. Continued insertion of the terminal into the cavity causes the cam member to ride up on ıe top 48 of the terminal and flex the strip 32 away from ıe terminal. The flexing of the strip moves the latch ıember 36 away from the terminal during insertion. /hen the terminal is fully inserted with lead end 52 abut-ng bevel 18, cam member 34 has fallen off of terminal ıp 48 and latch member 36 has fallen into groove 50 engage the lead edge thereof and prevent withdrawal the terminal from the cavity.

As cam member 34 rides up onto the top 48 of the rminal 14, there is a certain amount of wear on face due to contact with the sharp corner of the terminal. /ith repeated insertions of the terminal into the cavity, ce 42 of the cam member is gradually worn. Because ıe cam member rides on the top of the terminal and exes the strip 32 away therefrom, there is no appreciable ear on the latch means 36 arising from repeated inser-ons of the terminal into the cavity. Thus despite the fact at the trailing side of cam member 36 becomes worn, ıe latch member remains intact to assure that the termi-ıl 14 is positively held in the connector block. Because ıe cam member is provided with a wide, flat contact sur-ce 46 of appreciable longitudinal extent, the wear of ıce 42 does not reduce the altitude of the cam member permit latch 36 to engage the top of the terminal.

Figure 6:
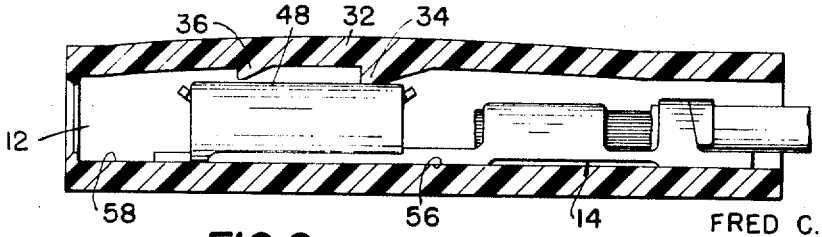

During insertion of the terminal into the connector ock the cam member 34 rides along the top of the rminal and momentarily falls into slot 50 as the termi-ıl is moved from the position shown in FIGURE 5 to e position shown in FIGURE 6. During the time the ım member 34 is within slot 50, latch member 36 slides ong the top 48 of the terminal. However, because the ngitudinal extent of the cam member 34 is large relative that of the slot 50, the latch member 36 is in contact ith the terminal for only a very short distance. The slid-g of cam member 34 and latch member 36 along the ıp of the terminal does not wear or deform either of the embers appreciably because of the sliding nature of the ntact and the relatively low coefficient of friction be-een the insulating material of block 10 and the termi-ıl 14.

*The portions of the tapered surface 42 and flat contact rface 46 which engage terminal 14 during insertion de-ıe the cam surface on cam member 34 for moving the cking face or latch 40 away from the terminal during sertion. The entire cam surface is physically spaced ıart or separated from the latch so that the latch is not orn down when the cam engages the terminal during sertion.*

Side wall 42 of cam member 34 slopes into the lower ırface of strip 32 at an angle of about 30°. It has been ınd that by forming the surface 42 at this angle the rminal 14 may be easily inserted into the terminal vity without requiring undue force in order to cam the rip 32 away from the terminal. Additionally, by utilizing cam angle of approximately 30°, wear between cam ember 34 and the leading edge of the terminal top 48 reduced.

The terminal 14 may be removed from the terminal vity 12 by inserting an appropriate tool through cavity ots 26 so that it engages the strip 32, and then moving e tool away from the connector block to flex the strip vay from the cavity and bring members 34, 36 out of ıgagement with the terminal. Removal of the terminal then completed by pulling on wire 20 to slide the termi-ıl 14 out of the cavity.

The flat bottom surface 56 of terminal 14 slides free-along the flat bottom surface 58 of cavity 12 to facili-te easy insertion and removal of the terminal from the nnector block 10. The length of the cavity 12 is greater an the length of terminal 14 so that the connector block fully insulates the inserted terminal against accidental ectrical contact with other circuit elements.

The invention has been described in connection with connector block for a contact terminal. However, it is ot intended to be limited to a connector block for holding such a terminal. The connector block 10 may be utilized to hold any type of a circuit element in a desired location. Thus the term "terminal" as used in the following claims refers to any type of circuit element, such as a thermistor, diode, resistor, thermocouple and the like. It is not necessary to practice of the invention that the terminal is secured to a wire. The connector block may be used to hold a splice type terminal in place whereby circuit elements may be inserted into the connector through one or both ends of the cavity.

While we have illustrated and described a preferred embodiment of our invention, it is understood that this is capable of modification, and we therefore do not wish to be limited to the precise details set forth but desire to avail ourselves of such changes and alterations as fall within the purview of the following claims.

What we claim as our invention is:

1. A connector block for a terminal comprising an insulating housing having a terminal cavity therein communicating with one side of the housing to form a terminal entrance and including a flexible wall for said cavity, latch means and cam means spaced apart on said wall *by a surface on the wall free of the terminal during insertion of the terminal into the cavity,* said latch means operable to engage part of a terminal when said terminal is fully inserted into said cavity so as to hold the same in the cavity, said cam means extending into the cavity for engagement with the terminal to flex the wall outwardly of the cavity and move said latch means out of the path of the terminal during insertion of the terminal into the cavity.

2. A connector block as in claim 1 wherein said latch means comprises a stop extending into said cavity and includes a locking surface facing away from said entrance and engageable with said part of said terminal for holding the terminal against withdrawal from the cavity, said cam means extending into said cavity further than said latch means.

3. A connector block as in claim 1 wherein said cam means includes a flat contact surface at its apex and a cam surface facing toward said entrance and sloping from said contact surface toward said wall.

4. A connector block as in claim 3 wherein said cam surface slopes toward said wall at an angle of about 30°.

5. A connector block as in claim 2 wherein said cam means and latch means are spaced along said wall relative to said entrance with said cam means located between said entrance and said latch means.

6. A connector block as in claim 1 wherein said housing is provided with at least one slit in said wall adjacent said cam and latch means to facilitate flexing of said wall.

7. A connector block as in claim 6 wherein said slit extends away from said entrance and said cam means is located between said entrance and said latch means.

8 A connector block as in claim 7 wherein said latch means comprises a stop extending into said cavity and includes a locking surface facing away from said entrance and engageable with said part of said terminal for holding the terminal against withdrawal from the cavity, said cam means extending into said cavity further than said latch means.

9. A connector block as in claim 2 wherein said housing includes means to limit insertion of the terminal into said cavity to a position where said locking surface of said latch means engages said part of the terminal.

10. A connector block as in claim 1 wherein said cavity is provided with an opening opposite said entrance to permit insertion of a circuit element through said opening and into the cavity for engagement with the terminal.

11. A connector block for a terminal comprising an insulating housing having a terminal cavity therein communicating with one side of the housing to form a terminal entrance, a flexible strip forming at least a part of one side of said cavity, latch means and cam means spaced apart on said strip *by a surface on the strip free of the terminal during insertion of the terminal into the cavity*, said latch means operable to engage part of a terminal when the latter is fully inserted into said cavity so as to hold the same in the cavity, said cam means extending into the cavity for engagement with the terminal to flex said strip outwardly of the cavity and move said latch means out of the path of the terminal during insertion of the terminal into said cavity.

12. A connector block as in claim 11 wherein opposite ends of said strip are secured to said housing and said cam and latch means are located on the median portion of said strip.

13. A connector block as in claim 12 wherein said cam and latch means are longitudinally spaced along said strip with said cam means between said entrance and said latch means.

14. A connector block as in claim 13 wherein said latch means comprises a stop extending into said cavity and includes a locking sufarec facing away from said entrance and engageable with a part of said terminal for holding the terminal against withdrawal from the cavity, and wherein said cam means includes a cam surface facing said entrance and sloping toward said strip for engaging said terminal during insertion thereof to flex said strip away from said cavity and move said latch means out of the path of said terminal during insertion of said terminal into said cavity.

15. A connector block as in claim 14 wherein said housing includes means to limit insertion of the terminal into said cavity to a position where said locking surface of said latch means engages said part of the terminal.

16. A connector block as in claim 15 wherein said cavity is provided with an opening opposite said entrance to permit insertion of a circuit element through said opening and into the cavity for engagement with the terminal.

*17. A connector block for a terminal comprising an insulating housing having a terminal cavity therein communicating with one side of the housing to form a terminal entrance, a flexible portion of the connector block forming at least a part of one side of said cavity, latch means and cam means entirely spaced apart on said portion by a surface on the portion free of the terminal during insertion of the terminal into the cavity, said latch means operable to engage part of a terminal when the latter is fully inserted into said cavity so as to hold the same in the cavity, said cam means extending into the cavity for engagement with the terminal to flex said portion outwardly of the cavity and thereby move said latch means out of the path of the terminal during insertion of the terminal into said cavity.*

*18. A connector block for a terminal comprising an insulating housing having a terminal cavity therein communicating with one side of the housing to form a terminal entrance and including a flexible portion adjacent said cavity, latch means and cam means on said portion, a surface on said portion entirely separating said latch means and cam means, said latch means operable to engage part of a terminal when said terminal is fully inserted into the cavity so as to hold the same in the cavity, said cam means extending into the cavity for engagement with the terminal to flex said portion outwardly of the cavity and move said latch means out of the path of the terminal during insertion of the terminal into the cavity without engagement between the terminal and the surface.*

*19. A connector block for a terminal comprising a housing having a terminal cavity therein communicating with one side of the housing to form a terminal entrance, a flexible portion of said housing forming at least a part of one side of said cavity, a latch and a cam on said portion, said latch including a latching surface facing away from said entrance, said cam including a cam surface extending into said cavity for engagement with the terminal to move said portion outwardly of the cavity and thereby move said latch surface out of the path of insertion of the terminal into the cavity, said cam surface and said latch surface being entirely spaced apart on said portion by a surface on the portion free of the terminal during insertion of the terminal into the cavity.*

*20. A connector block as in claim 19 wherein said cam is located between said latch and said entrance.*

*21. A connector block as in claim 19 wherein said cam is located between said latch and said entrance and said cam extends into the cavity a distance further than said latch.*

*22. A connector block as in claim 19 wherein said portion comprises a flexible strip formed from said housing and said cam and latch are spaced longitudinally along said strip.*

*23. A connector block as in claim 22 wherein said strip extends away from said entrance.*

*24. A connector block for a terminal comprising an insulating housing having a terminal cavity therein communicating with one side of the housing to form a terminal entrance, a flexible strip forming at least a part of one side of said cavity, a pair of physically spaced apart projections on said strip extending into said cavity, a latch surface facing away from said entrance on one of said projections for engaging a part of a terminal when the latter is fully inserted into the cavity so as to hold the same in the cavity, a cam surface on the other of said projections extending into said cavity for engagement with a terminal during insertion thereof into the cavity to flex said strip outwardly of the cavity and thereby move said latch surface out of the path of the terminal during insertion of the terminal into the cavity.*

*25. A connector block for a terminal comprising an insulating housing having a terminal cavity therein communicating with one side of the housing to form a terminal entrance, a flexible portion of said housing forming at least a part of one side of said cavity, a latch surface on said portion for preventing withdrawal of the terminal from the cavity, a cam surface on said portion and a third surface on said portion entirely separating said latch surface from said cam surface, said cam surface being engageable with a terminal during insertion of the terminal into the cavity to move said portion out of the cavity and thereby hold said latch out of the path of insertion of the terminal as the terminal is moved into the cavity without engagement between the terminal and the third surface.*

*26. A connector block as in claim 25 wherein said portion comprises a flexible strip extending away from said entrance and said cam and latch surfaces are spaced along said strip with said cam surface located between said latch surface and said entrance.*

References Cited

The following references, cited by the Examiner, are of record in the patented file of this patent or the original patent.

UNITED STATES PATENTS

| | | | |
|---|---|---|---|
| 2,791,755 | 5/1957 | Hammell | 339—256 X |
| 3,012,159 | 12/1961 | Druesedow | 339—217 |
| 3,101,958 | 8/1963 | Skony | 339—217 X |

FOREIGN PATENTS

| | | |
|---|---|---|
| 959,500 | 6/1964 | Great Britain. |

RICHARD E. MOORE, Primary Examiner

U.S. Cl. X.R.

339—256 SP